(12) United States Patent
Aflatooni et al.

(10) Patent No.: US 12,548,534 B2
(45) Date of Patent: *Feb. 10, 2026

(54) DISPLAY WITH LOCALIZED BRIGHTNESS ADJUSTMENT CAPABILITIES

(71) Applicant: Apple Inc., Cupertino, CA (US)

(72) Inventors: Koorosh Aflatooni, Los Altos Hills, CA (US); Minhyuk Choi, San Jose, CA (US); Mohammad Ali Jangda, Sunnyvale, CA (US); Sang Y. Youn, Cupertino, CA (US); Yafei Bi, Los Altos Hills, CA (US); Jean-Pierre Guillou, La Jolla, CA (US); Wei H. Yao, Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/015,413

(22) Filed: Jan. 9, 2025

(65) Prior Publication Data

US 2025/0149010 A1 May 8, 2025

Related U.S. Application Data

(63) Continuation of application No. 18/493,576, filed on Oct. 24, 2023, now Pat. No. 12,198,656, which is a
(Continued)

(51) Int. Cl.
*G09G 5/10* (2006.01)
*G06V 40/13* (2022.01)

(52) U.S. Cl.
CPC ............... *G09G 5/10* (2013.01); *G06V 40/13* (2022.01); *G06V 40/1318* (2022.01);
(Continued)

(58) Field of Classification Search
CPC ............... G09G 5/10; G09G 2360/148; G09G 2320/0626; G09G 2360/144; G06V 40/1318; G06V 40/13
See application file for complete search history.

(56) References Cited

U.S. PATENT DOCUMENTS

| 5,726,443 A | 3/1998 | Immega et al. |
| 6,028,581 A | 2/2000 | Umeya |

(Continued)

FOREIGN PATENT DOCUMENTS

| EP | 1335430 A1 | 8/2003 |
| EP | 2144293 B1 | 1/2010 |

(Continued)

*Primary Examiner* — Muhammad N Edun
(74) *Attorney, Agent, or Firm* — Treyz Law Group, P.C.; G. Victor Treyz; Jinie M. Guihan

(57) ABSTRACT

An electronic device may have a display with an array of pixels. The device may have an array of components such as an array of light sensors for capturing fingerprints of a user through an array of corresponding transparent windows in the display. A capacitive touch sensor, proximity sensor, force sensor, or other sensor may be used by control circuitry in the device to monitor for the presence of a user's finger over the array of light sensors. In response, the control circuitry can direct the display to illuminate a subset of the pixels, thereby illuminating the user's finger and causing reflected light from the finger to illuminate the array of light sensors for a fingerprint capture operation. The display may have display driver circuitry that facilitates the momentary illumination of the subset of pixels with uniform flash data while image data is displayed in other portions of the display.

20 Claims, 11 Drawing Sheets

Related U.S. Application Data continuation of application No. 18/160,495, filed on Jan. 27, 2023, now Pat. No. 11,842,708, which is a continuation of application No. 17/741,138, filed on May 10, 2022, now Pat. No. 11,580,934, which is a continuation of application No. 17/216,376, filed on Mar. 29, 2021, now Pat. No. 11,348,555, which is a continuation of application No. 16/584,807, filed on Sep. 26, 2019, now Pat. No. 10,984,752, which is a continuation of application No. 16/222,492, filed on Dec. 17, 2018, now Pat. No. 10,467,985, which is a continuation of application No. 15/257,448, filed on Sep. 6, 2016, now Pat. No. 10,157,590.

(60) Provisional application No. 62/267,537, filed on Dec. 15, 2015.

(52) U.S. Cl.
CPC .............. *G09G 2320/0626* (2013.01); *G09G 2360/144* (2013.01); *G09G 2360/148* (2013.01)

(56) References Cited

U.S. PATENT DOCUMENTS

| | | |
|---|---|---|
| 6,172,667 B1 | 1/2001 | Sayag |
| 6,339,429 B1 | 1/2002 | Schug |
| 6,430,325 B1 | 8/2002 | Shimoda |
| 6,459,436 B1 | 10/2002 | Kumada |
| 6,559,433 B1 | 5/2003 | Ozawa |
| 7,164,961 B2 | 1/2007 | Mei et al. |
| 7,460,196 B2 | 12/2008 | Kim et al. |
| 7,468,721 B2 | 12/2008 | Nakano |
| 7,804,493 B2 | 9/2010 | Gettemy |
| 7,825,891 B2 | 11/2010 | Yao et al. |
| 7,960,682 B2 | 6/2011 | Gardner, Jr. |
| 8,194,031 B2 | 6/2012 | Yao et al. |
| 8,330,909 B2 | 12/2012 | Yoshida et al. |
| 8,361,818 B2 | 1/2013 | Cho et al. |
| 8,384,003 B2 | 2/2013 | Gardner, Jr. |
| 8,947,627 B2 | 2/2015 | Rappoport et al. |
| 8,987,652 B2 | 3/2015 | Zheng |
| 9,024,530 B2 | 5/2015 | Land et al. |
| 9,028,718 B2 | 5/2015 | Kijima et al. |
| 9,070,648 B2 | 6/2015 | de Jong et al. |
| 9,129,548 B2 | 9/2015 | Zheng |
| 9,183,779 B2 | 11/2015 | Soto |
| 9,223,442 B2 | 12/2015 | Hoffman |
| 9,245,934 B2 | 1/2016 | Chung et al. |
| 9,299,748 B2 | 3/2016 | Schicktanz et al. |
| 9,310,843 B2 | 4/2016 | Shedletsky et al. |
| 9,354,735 B2 | 5/2016 | Abileah et al. |
| 9,466,653 B2 | 10/2016 | de Jong et al. |
| 9,829,614 B2 | 11/2017 | Smith et al. |
| 10,381,381 B1 | 8/2019 | Choi et al. |
| 2001/0000676 A1 | 5/2001 | Zhang et al. |
| 2002/0079512 A1 | 6/2002 | Yamazaki et al. |
| 2003/0174870 A1 | 9/2003 | Kim et al. |
| 2003/0189211 A1 | 10/2003 | Deitz |
| 2003/0189586 A1 | 10/2003 | Vronay |
| 2004/0036820 A1 | 2/2004 | Runolinna |
| 2004/0095402 A1 | 5/2004 | Nakano |
| 2004/0140762 A1 | 7/2004 | Tohma et al. |
| 2005/0056842 A1 | 3/2005 | Nashi et al. |
| 2005/0219197 A1 | 10/2005 | Pasqualini et al. |
| 2006/0033016 A1 | 2/2006 | Ogawa et al. |
| 2006/0049533 A1 | 3/2006 | Kamoshita |
| 2006/0238517 A1 | 10/2006 | King et al. |
| 2006/0267625 A1 | 11/2006 | Kaneko |
| 2007/0236485 A1 | 10/2007 | Trepte |
| 2007/0252005 A1 | 11/2007 | Konicek |
| 2007/0257254 A1 | 11/2007 | Yang et al. |
| 2008/0084374 A1 | 4/2008 | Abileah et al. |
| 2008/0158173 A1 | 7/2008 | Hamblin et al. |
| 2008/0284716 A1 | 11/2008 | Edwards |
| 2009/0002341 A1 | 1/2009 | Saito et al. |
| 2009/0033850 A1 | 2/2009 | Ishiguro et al. |
| 2009/0074255 A1 | 3/2009 | Holm |
| 2009/0102763 A1 | 4/2009 | Border et al. |
| 2009/0251560 A1 | 10/2009 | Azar et al. |
| 2010/0079426 A1 | 4/2010 | Pance et al. |
| 2010/0148163 A1 | 6/2010 | Im et al. |
| 2010/0177046 A1 | 7/2010 | Shin et al. |
| 2010/0273530 A1 | 10/2010 | Jarvis et al. |
| 2010/0277634 A1 | 11/2010 | Watanabe |
| 2010/0302196 A1 | 12/2010 | Han et al. |
| 2011/0122560 A1 | 5/2011 | Andre et al. |
| 2011/0147571 A1 | 6/2011 | Bieber et al. |
| 2011/0216042 A1 | 9/2011 | Wassvik et al. |
| 2011/0220922 A1 | 9/2011 | Kim et al. |
| 2011/0227873 A1 | 9/2011 | Chung et al. |
| 2011/0234538 A1 | 9/2011 | Chen et al. |
| 2011/0248961 A1 | 10/2011 | Svajda et al. |
| 2011/0267198 A1 | 11/2011 | Erhart et al. |
| 2012/0043894 A1 | 2/2012 | Koh et al. |
| 2012/0106808 A1 | 5/2012 | Morioka et al. |
| 2012/0153153 A1 | 6/2012 | Chang et al. |
| 2012/0176298 A1 | 7/2012 | Suh et al. |
| 2012/0194441 A1 | 8/2012 | Frey |
| 2012/0218239 A1 | 8/2012 | Yao et al. |
| 2012/0267611 A1 | 10/2012 | Chung et al. |
| 2013/0002731 A1 | 1/2013 | Tam |
| 2013/0076712 A1 | 3/2013 | Zheng et al. |
| 2013/0094126 A1 | 4/2013 | Rappoport et al. |
| 2013/0106813 A1 | 5/2013 | Hotelling et al. |
| 2013/0161489 A1 | 6/2013 | Gardner |
| 2013/0222681 A1 | 8/2013 | Wan |
| 2014/0085265 A1 | 3/2014 | Yin |
| 2015/0331508 A1 | 11/2015 | Nho et al. |
| 2016/0189671 A1 | 6/2016 | Kim et al. |
| 2016/0342282 A1 | 11/2016 | Wassvik |
| 2017/0091506 A1 | 3/2017 | Sinha et al. |
| 2017/0169275 A1 | 6/2017 | Mackey et al. |
| 2017/0255813 A1 | 9/2017 | Chen et al. |
| 2018/0040279 A1 | 2/2018 | Kimura et al. |

FOREIGN PATENT DOCUMENTS

| | | |
|---|---|---|
| EP | 2432196 B1 | 3/2012 |
| TW | 201237962 A | 9/2012 |
| WO | 200041378 A1 | 7/2000 |
| WO | 200237454 A2 | 5/2002 |
| WO | 2007069107 A3 | 6/2007 |
| WO | 2017048478 A1 | 3/2017 |

DISPLAY WITH LOCALIZED BRIGHTNESS ADJUSTMENT CAPABILITIES

This application is a continuation of patent application Ser. No. 18/493,576, filed Oct. 24, 2023, which is a continuation of patent application Ser. No. 18/160,495, filed Jan. 27, 2023, now U.S. Pat. No. 11,842,708, which is a continuation of patent application Ser. No. 17/741,138, filed May 10, 2022, now U.S. Pat. No. 11,580,934, which is a continuation of patent application Ser. No. 17/216,376, filed Mar. 29, 2021, now U.S. Pat. No. 11,348,555, which is a continuation of patent application Ser. No. 16/584,807, filed Sep. 26, 2019, now U.S. Pat. No. 10,984,752, which is a continuation of patent application Ser. No. 16/222,492, filed Dec. 17, 2018, now U.S. Pat. No. 10,467,985, which is a continuation of patent application Ser. No. 15/257,448, filed Sep. 6, 2016, now U.S. Pat. No. 10,157,590, which claims the benefit of provisional patent application No. 62/267,537, filed Dec. 15, 2015, all of which are incorporated by reference herein in their entireties.

BACKGROUND

This relates generally to electronic devices, and, more particularly, to electronic devices with displays.

Electronic devices often include displays. Displays such as organic light-emitting diode displays have pixels with light-emitting diodes. During normal operation, the pixels are illuminated to display images for a user.

In some situations, it may be desirable to provide non-image illumination with the pixels. If care is not taken, this illumination will not have desired attributes.

It would therefore be desirable to be able to provide improved electronic devices and display arrangements for accommodating the use of pixels to provide non-image illumination.

SUMMARY

An electronic device may have a display. The display may have an array of pixels such as an array of pixels with organic light-emitting diodes or other light-emitting diodes. The device may have an array of electrical components mounted under the display. The electrical components may be an array of light sensors for capturing fingerprints from a user or for gathering information on other external objects. The light sensors in the array may gather light readings through an array of corresponding transparent windows in the display.

A capacitive touch sensor, proximity sensor, light detector, strain gauge sensor or other force sensor, or other sensor may be used by control circuitry in the device to monitor for the presence of a user's finger or other object over the array of light sensors. In response to detecting the user's finger, the control circuitry can direct the display to illuminate a portion of the display or all of the display with uniform light. For example, in a configuration in which a light sensor array occupies a portion of a display, a subset of the pixels that overlaps the light sensor may be illuminated.

The illuminated subset of pixels can produce a flash of illumination or may otherwise be adjusted in brightness independently from pixels in the rest of the display. The flash may be relatively brief. For example, the length of the flash may be equal to one frame time (e.g., 1/60 s in a display in which the rate at which image frames are displayed is 60 Hz). The flash may illuminate a user's finger that is adjacent to the subset of pixels and the light sensor array. Reflected light from the user's finger may illuminate the array of light sensors for a fingerprint capture operation. Illuminating the light sensors with a flash of light from subset of the pixels overlapping the light sensor array (i.e., a flash region) may help ensure that fingerprint capture operations are performed satisfactorily.

The display may have display driver circuitry that facilitates the momentary illumination of the subset of pixels with uniform flash data while image data or other suitable data is displayed in other portions of the display. The display driver circuitry may have multiplexer circuitry that selectively routes either image data or flash data to a set of pixels in a fixed flash region on the display or may have multiplexer circuitry that can be dynamically configured to place the flash region at a desired location on the display.

Further features will be more apparent from the accompanying drawings and the following detailed description.

DETAILED DESCRIPTION

Figure 1:
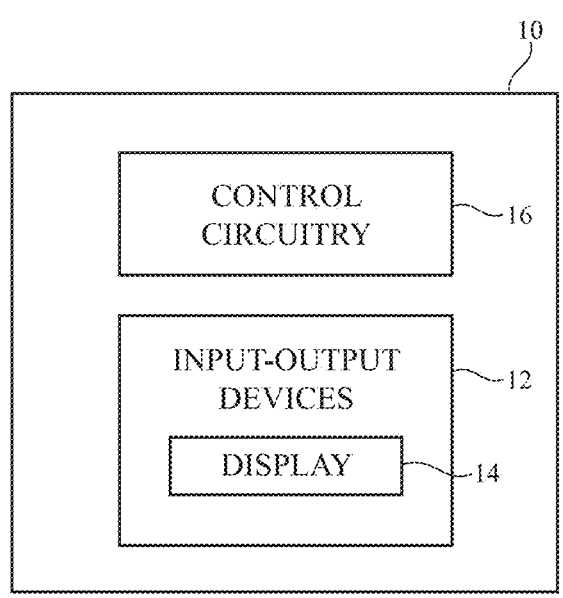
FIG. 1 is a schematic diagram of an illustrative electronic device having a display in accordance with an embodiment.

An illustrative electronic device of the type that may be provided with a display is shown in FIG. 1. As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors (e.g., light-based proximity sensors such as infrared proximity sensors, capacitive touch sensors, force sensors such as capacitive force sensors and strain gauge force sensors, light detectors, etc.), light-emitting diodes and other status indicators, data ports, and other electrical components. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Control circuitry 16 may be used to run software on device 10 such as operating system code and applications. During operation of device 10, the software running on control circuitry 16 may display images on display 14 using an array of pixels in display 14.

When it is desired to produce illumination with the pixels of display 14, the software running on control circuitry 16 may use display 14 to illuminate a region of the pixels on display 14. The region may, for example, be a rectangular portion of display 14 or a region with another shape that serves as flash illumination for a photograph, flash illumination for a fingerprint capture operation, illumination for document scanning operations, or illumination for other operations in which an object external to device 10 is to be illuminated.

The illuminated region, which may sometimes be referred to as a flash region or flash area, may be white or may have other colors. The color of the flash area (e.g., the color temperature of a white flash area) may be adjusted to provide illumination with desired color characteristics (e.g., to satisfy aesthetic requirements, to enhance the warmth of a photograph, to ensure that a fingerprint capture operation is performed satisfactorily, etc.). The brightness of the flash area may also be adjusted. Uniform flash illumination is generally appropriate, but non-uniform patterns of illumination may be provided, if desired.

Device 10 may be a tablet computer, laptop computer, a desktop computer, a display, a cellular telephone, a media player, a wristwatch device or other wearable electronic equipment, or other suitable electronic device.

Display 14 may be an organic light-emitting diode display or may be a display based on other types of display technology. Configurations in which display 14 is an organic light-emitting diode display are sometimes described herein as an example. This is, however, merely illustrative. Any suitable type of display may be used, if desired.

Display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 2:
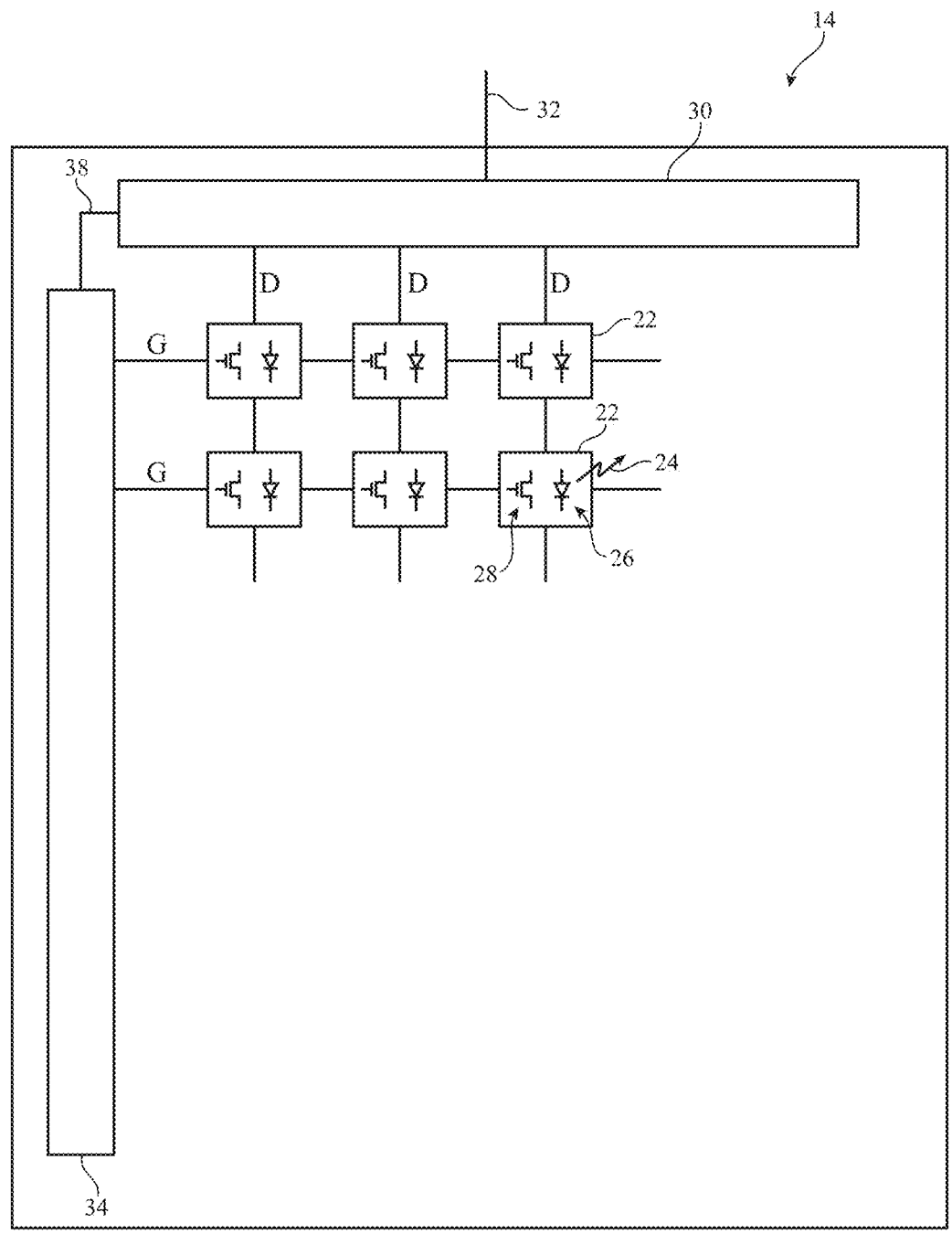
FIG. 2 is a top view of an illustrative display in an electronic device in accordance with an embodiment.

A top view of a portion of display 14 is shown in FIG. 2. As shown in FIG. 2, display 14 may have an array of pixels 22 formed on substrate 36. Substrate 36 may be formed from glass, metal, plastic, ceramic, or other substrate materials. Pixels 22 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 22 in display 14 (e.g., tens or more, hundreds or more, or thousands or more). Each pixel 22 may have a light-emitting diode 26 that emits light 24 under the control of a pixel circuit formed from thin-film transistor circuitry such as thin-film transistors 28 and thin-film capacitors). Thin-film transistors 28 may be polysilicon thin-film transistors, semiconducting-oxide thin-film transistors such as indium gallium zinc oxide transistors, or thin-film transistors formed from other semiconductors. Pixels 22 may contain light-emitting diodes of different colors (e.g., red, green, and blue diodes for red, green, and blue pixels, respectively) to provide display 14 with the ability to display color images.

Display driver circuitry may be used to control the operation of pixels 22. The display driver circuitry may be formed from integrated circuits, thin-film transistor circuits, or other suitable circuitry. Display driver circuitry 30 of FIG. 2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply circuitry 30 with information on images to be displayed on display 14.

To display the images on display pixels 22, display driver circuitry 30 may supply image data to data lines D while issuing clock signals and other control signals to supporting display driver circuitry such as gate driver circuitry 34 over path 38. Gate driver circuitry 34 can assert appropriate gate signals (e.g., gate signals in successive rows may be asserted in sequence to load each frame of data). If desired, circuitry 30 may also supply clock signals and other control signals to gate driver circuitry on an opposing edge of display 14.

Gate driver circuitry 34 (sometimes referred to as horizontal control line control circuitry) may be implemented as part of an integrated circuit and/or may be implemented using thin-film transistor circuitry. Horizontal control lines G in display 14 may carry gate line signals (e.g., scan line signals, emission enable control signals, and other horizontal control signals) for controlling the pixels of each row. There may be any suitable number of horizontal control signals per row of pixels 22 (e.g., one or more, two or more, three or more, four or more, etc.).

Figure 3:
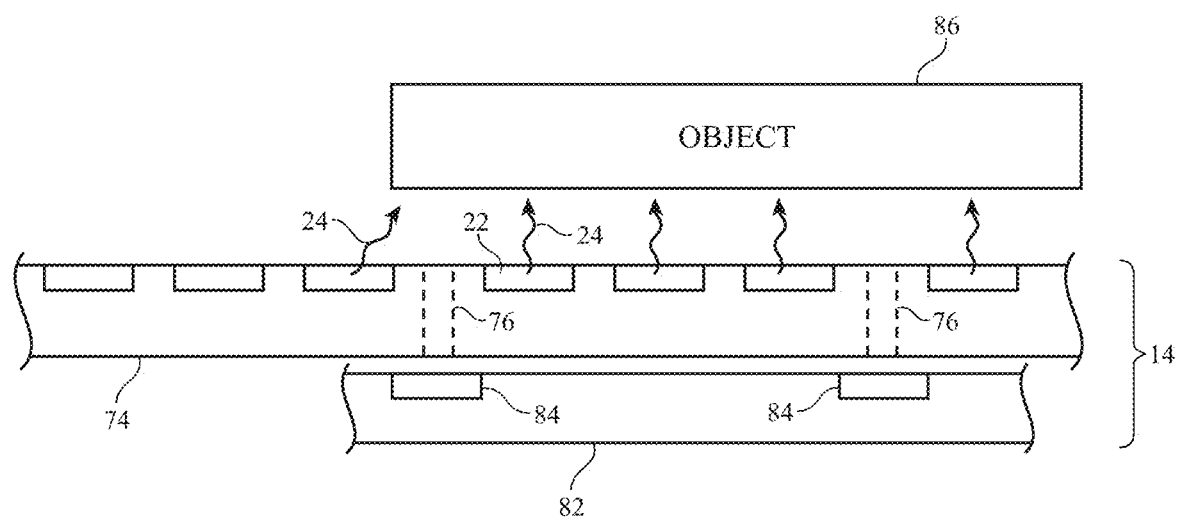
FIG. 3 is a cross-sectional side view of a display with an array of electrical components in accordance with an embodiment.

It may be desirable to incorporate electrical components into display 14 and/or device 10. As shown in FIG. 3, for example, electrical components 84 may be incorporated into device 10 under pixels 22. Components 84 may be discrete components or may be formed as part of a common integrated circuit or other shared component. Components 84 may, as an example, be formed as part of device 82 (e.g., an integrated circuit) or may be mounted on a printed circuit substrate.

Electrical components 84 may be audio components (e.g., microphones, speakers, etc.), radio-frequency components, haptic components (e.g., piezoelectric structures, vibrators, etc.), may be capacitive touch sensor components or other touch sensor structures, may be temperature sensors, pressure sensors, magnetic sensors, or other sensors, or may be any other suitable type of electrical component. With one suitable arrangement, which may sometimes be described herein as an example, electrical components 84 may be light-based components (e.g., components that emit and/or detect visible light, infrared light, and/or ultraviolet light).

Light-based components 84 may emit and/or detect light that passes through transparent windows 76 in display 14. Windows 76 may be formed in regions located between pixels 22 and may include transparent materials (e.g., clear plastic, glass, etc.) and/or holes (e.g., air-filled openings or openings filled with transparent material that pass partly or fully through substrate 36 and other display layers 74 of display 14 such as thin-film layers forming thin-film transistors and organic light-emitting diodes).

There may be a window 76 between each pair of pixels 22 or, more preferably, blocks of pixels 22 (e.g., blocks of tens, hundreds, or thousands of pixels) may be associated with windows 76 and electrical components 84.

Examples of light-based components 84 that emit light include light-emitting diodes (e.g., organic light-emitting diodes, discrete crystalline light-emitting diode dies, etc.), lasers, and lamps. Examples of light-based components that detect light include light detectors such as photodiodes and phototransistors. Some components may, if desired, include both light emitters and detectors. For example, components 84 may emit infrared light and may include light detector structures for detecting a portion of the emitted light that has reflected from nearby objects such as object 86. Components of this type may be used to implement a proximity sensor. In configurations in which components 84 include light sensors, an array of components 84 may form a light-based fingerprint sensor (e.g., when object 86 is the finger of a user) or other light-based sensor (e.g., a light sensor that detects the presence or absence of a finger or other external object by determining when components 84 have been shadowed by object 86 so that ambient light at components 84 is reduced). The presence of a user's finger or other external object 86 over a given portion of display 14 (e.g., over a region that includes an array of components 84) may, if desired, be detected using a touch sensor formed from capacitive touch sensor electrodes in display 14, a force sensor (e.g., a capacitive force sensor that measures force by detecting capacitance changes as a user presses on a portion of display 14, a strain gauge that measures force on display 14, or other force sensing structures), a light detector (e.g., a light detector that detects the user's finger by measuring shadowing of ambient light), an infrared proximity sensor or array of infrared proximity sensors or other light-based sensors, etc.

If desired, light-based sensors such as these may sense fingerprints while object 86 is illuminated with light 24 from one or more of pixels 22. This light may be produced by placing a region of display 14 (i.e., a "flash region") in a flash mode. When operating normally, the pixels of the flash region may be used in displaying images for a user on display 14. In the flash mode, pixels 22 may produce a block of solid white light or other illumination to briefly illuminate object 86. Pixels 22 may, for example, produce a flash of white light that lasts for the duration of one frame of image data on display 14. The flash region of display 14 may be aligned with a portion of display 14 that includes an array of windows 76 (as an example). Finger sensing components such as a force sensor, capacitive touch sensor, proximity sensor, or other detector may also overlap this portion of display 14 to detect when a user's finger is present and flash illumination is appropriate.

Figure 4:
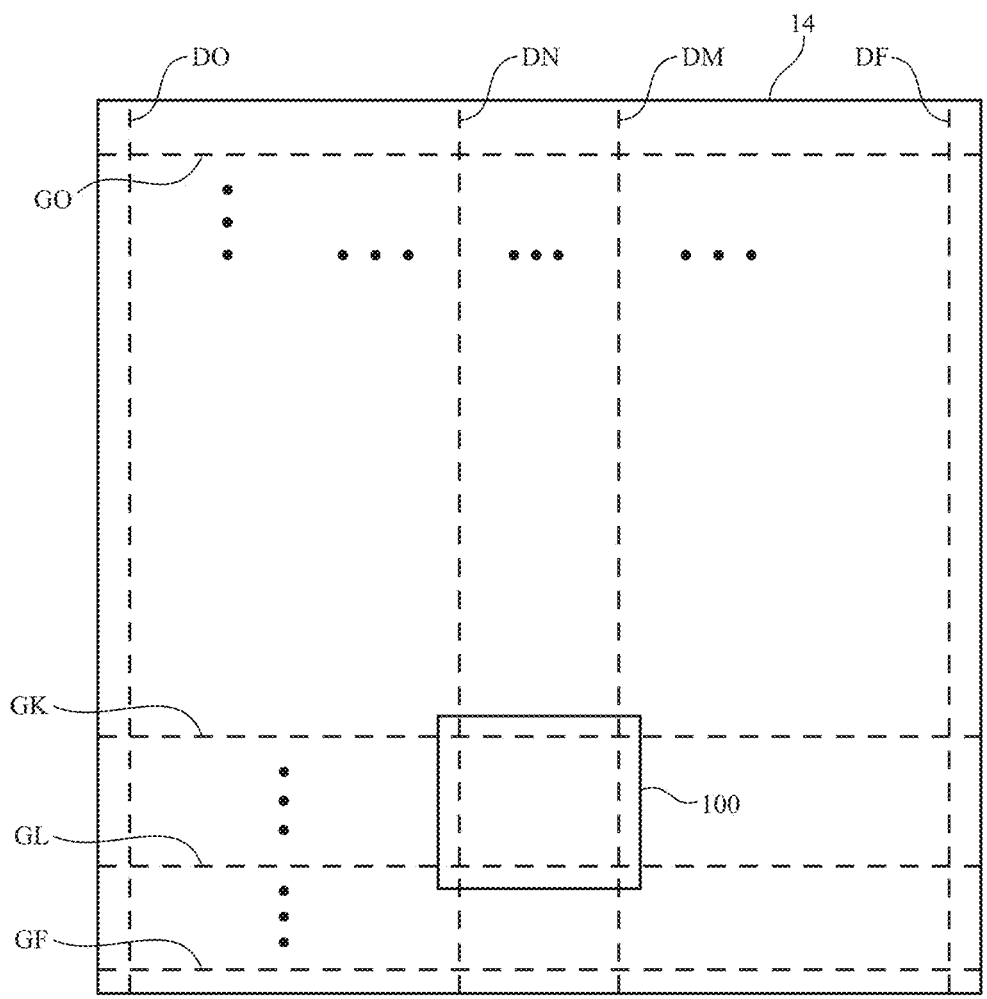
FIG. 4 is a top view of an illustrative display with a region that is being used to provide flash illumination in accordance with an embodiment.

An illustrative display with a flash region is shown in FIG. 4. In the illustrative configuration of FIG. 4, display 14 has an array of pixels 22 that receive data over vertical data lines D0 . . . DF while receiving control signals over horizontal gate lines G0 . . . GF. Flash region 100 may cover some or all of display 14 and may have a rectangular shape, an oval shape, a shape with curved edges, a shape with straight edges, a shape with a combination of curved and straight edges, a shape with multiple discrete parts that are separated from each other by intervening pixels that are actively displaying image data, or any other suitable shape. In the example of FIG. 4, flash region 100 has a rectangular shape and is located near to the lower edge of display 14. This is merely illustrative. Region 100 may have any suitable shape. The portions of display 14 that are not included in flash region 100 may sometimes be referred to as forming a non-flash region on display 14.

During normal image data loading operations, data lines D0 . . . DF may be used to load image data into display 14. Rows of pixels may be loaded in sequence by issuing control signals over gate lines G0 . . . GF.

Data line voltages suitable for operating the pixels of region 100 in flash mode may be supplied to the pixels of region 100 using data lines DN . . . DM while issuing a sequence of control signals on gate lines GK . . . GL.

Figure 5:
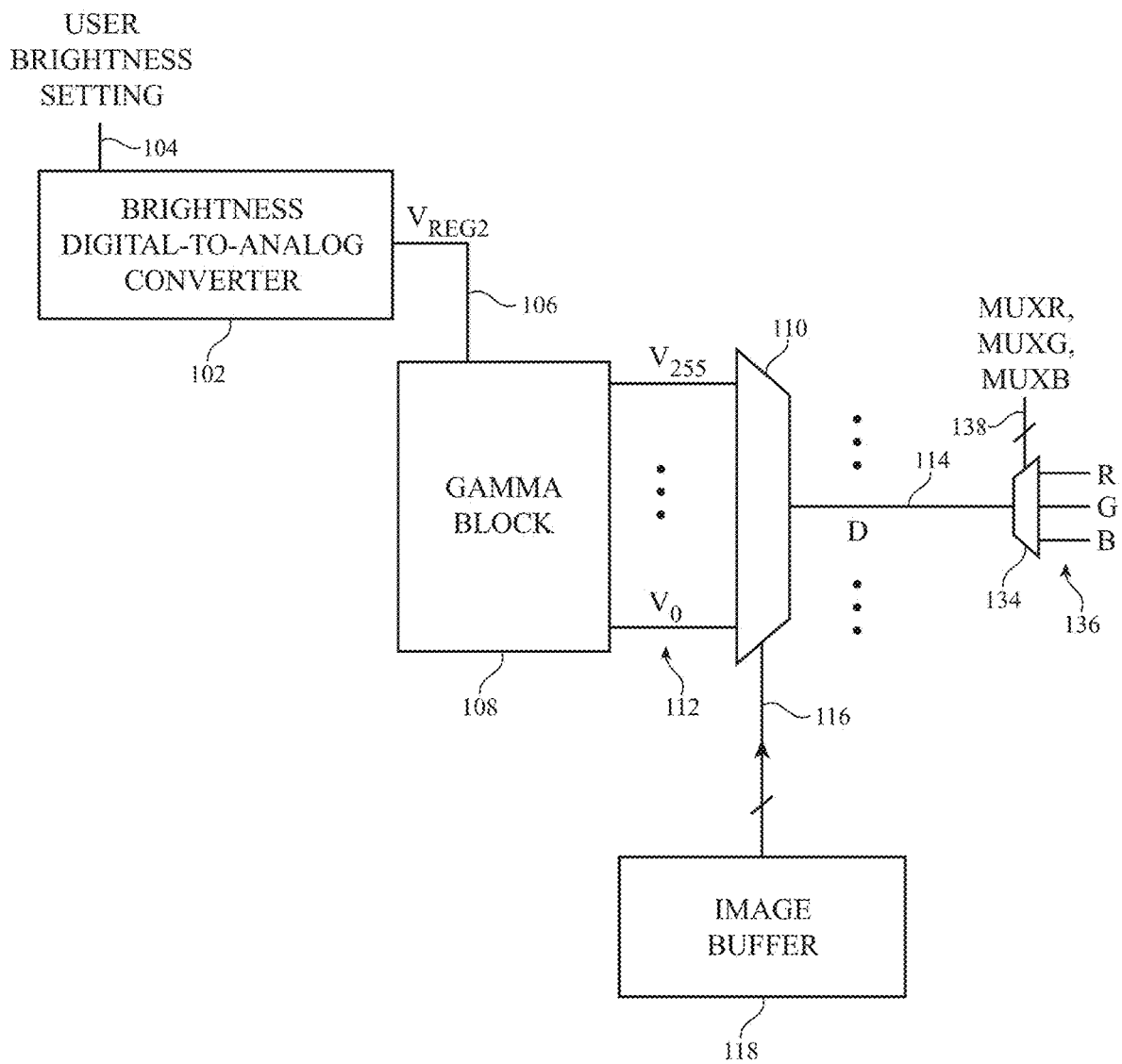
FIGS. 5 and 6 are diagrams of illustrative display driver circuitry in accordance with an embodiment.

Illustrative display driver circuitry (see, e.g., the display driver circuitry of FIG. 2) for display 14 is shown in FIG. 5. As shown in FIG. 5, the display driver circuitry may include a brightness digital-to-analog converter (DAC) such as converter 102. Converter 102 may receive a digital user brightness setting from input 104. The user brightness setting may, for example, be an overall level of display brightness for display 14 that a user of device 10 has supplied to device 10 using input-output devices 12 and/or that control circuitry 16 has determined based on other input such as input from an ambient light sensor. Converter 102 may supply a voltage Vreg2 at output 106 corresponding to the display brightness setting received at input 104. The value of Vreg2 may, for example, be relatively high when the brightness setting is high and may be relatively low when the brightness setting is low.

Gamma block 108 may receive voltage Vreg2 from output 106 and may generate a set of voltages V255 . . . V0 at outputs 112 (e.g., using a voltage divider formed from a resistor tree and other circuitry). The values of V225 . . . V0 may be used in establishing a desired mapping between digital image data values (e.g., 0 . . . 255 or other suitable range of values) and analog voltage levels for use as analog image data signals for the pixels of display 14. To display images on display 14, image buffer 118 may supply digital image data to gamma multiplexer 110 via path 116. Gamma multiplexer 110 may supply a desired voltage from one of lines 112 to line 114 to use as data signal D in response to the digital image data signal received from image buffer 118 on path 116. The gamma block circuitry and gamma multiplexer circuitry of display 14 may be used to supply signals to multiple data lines. The display driver circuitry of display 14 may, for example, include gamma block circuitry and gamma multiplexer circuitry that implement the functions of gamma block 108 and gamma multiplexer 110 of FIG. 5. Each gamma multiplexer 110 may, for example, be associated with a respective one of the data lines in display 14 and may supply that data line with an appropriate data line signal.

Display 14 may contain subpixels of different colors. For example, display 14 may contain red pixels (subpixels), green pixels (subpixels), and blue pixels (subpixels). Data signals D may be demultiplexed onto corresponding subpixel data lines 136 using data line demultiplexer circuitry such as data line demultiplexer 134. There may be a demultiplexer such as demultiplexer 134 associated with each column of red, green, and blue pixels. During operation, the voltage on line 114 may be placed in a state appropriate for a red subpixel while control signal MUXR is taken high to direct demultiplexer 134 to route the voltage on line 114 to red subpixel data line R. Control signals MUXG and MUXB may likewise be asserted to demultiplex the signal on line 114 onto data lines G and B.

The circuitry of FIG. 5 may be used for each of the data lines in display 14 that do not receive flash region data (i.e., data lines that do not overlap the flash region). In the example of FIG. 5, these data lines include data lines D0 . . . DN−1 and DM+1 . . . DF of display 14 of FIG. 4. Display driver circuitry of the type shown in FIG. 6 may be used for the data lines in display 14 that are configured to receive either image data or flash data (i.e., lines DN . . . DM that overlap region 100 in the example of FIG. 4). The display driver circuitry of FIG. 6 includes a mode selection multiplexer circuitry for each data line (mode selection multiplexer 124). The mode of operation of the display driver circuitry of FIG. 6 may be switched by control circuitry 16 between a normal image data loading mode and a flash data loading mode using mode selection signal MODE_SELECT.

Mode selection control signal MODE_SELECT may be deasserted whenever it is desired to route normal image data to subpixel data lines in the columns of display 14 associated with data lines DN . . . DM of FIG. 4. For example, MODE_SELECT may be deasserted when loading signals into the rows of pixels associated with gate lines G0 . . . GK−1 and GL+1 . . . GF during image display operations (and during flash operations) and may also be deasserted when loading signals into the rows of pixels associated with gate lines GK . . . GL during image display operations. In this mode (sometimes referred to as a normal mode, image mode, or non-flash mode), image data from a gamma multiplexer (see, e.g., multiplexer 110 of FIG. 5) that is supplied to multiplexer 124 at input 130 may be routed to line 132. Demuliplexer 134 may demultiplex this signal onto subpixel data lines 136.

Mode selection control signal MODE_SELECT may be asserted whenever it is desired to route flash data Df from line 128 to line 132 for loading into the pixels of flash region 100 (e.g., when loading signals into region 100 using data lines DN . . . DM and using gate lines GK . . . GL during flash mode operations in the example of FIG. 4).

Flash data signals Df may be generated by flash digital-to-analog converter 122 based on a digital flash setting signal that control circuitry 16 supplies to converter 122 at control input 120. Converter 122 may produce different values of Df for different flash brightness levels. For example, converter 122 may produce a relatively large voltage Vf for use as flash data Df when the flash setting on input 120 is set to a "high" setting, may produce a relatively low voltage Vf when the flash setting on input 120 is set to a "low" setting, and may produce an intermediate voltage Vf when the flash setting on input 120 is set to a "medium" setting. When high data values Df are loaded into the pixels of flash region 100, the pixels of region 100 will produce bright output. The use of medium or low data values Df will result in corresponding medium or low output light levels from region 100. The use of three different brightness settings is merely illustrative. Converter 122 may support more than three different brightness levels or fewer than three different levels. Converter 122 may also produce data values Df that are different for the subpixels of different colors in region 100. This allows the color temperature or other color attributes of the output light produced by flash region 100 to be adjusted. Color adjustments may be made independently of brightness level adjustments or different colors may be associated with different brightness levels. Flash data Df is generally uniform across region 100 (i.e., all of pixels 22 in region 100 receive the same data: the same red subpixel value, the same green subpixel value, and the same blue subpixel value). If desired, data Df can be varied within region 100 to create flash illumination with a non-uniform intensity pattern.

Figure 6:
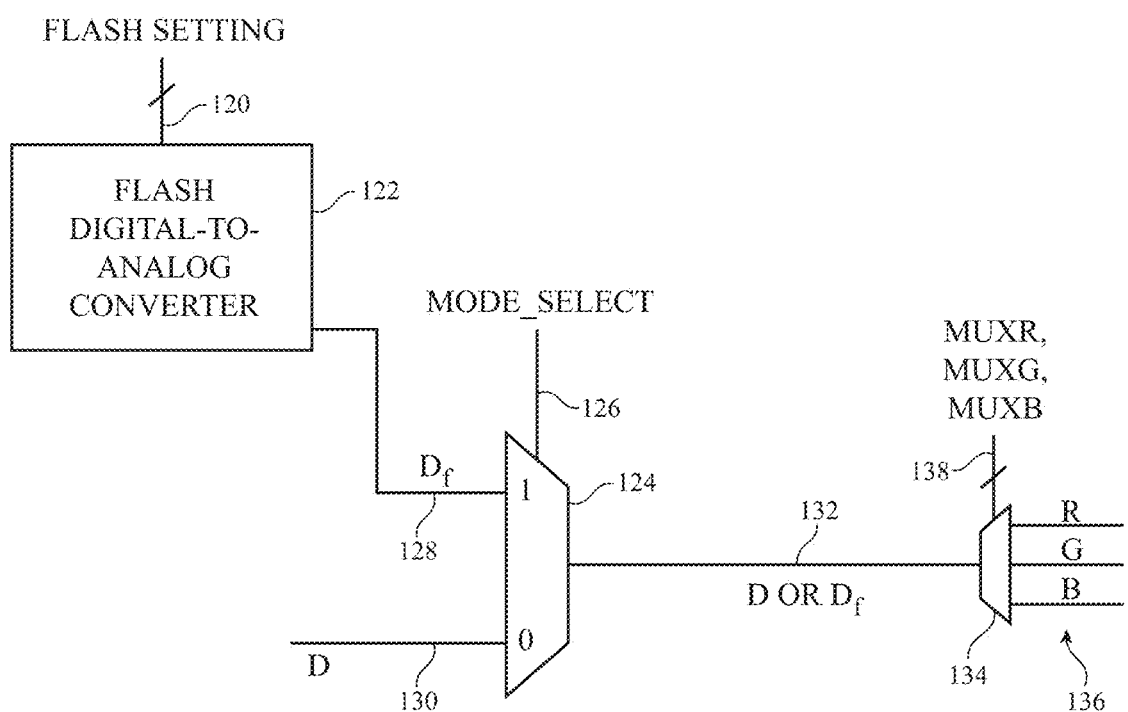
Figure 7:
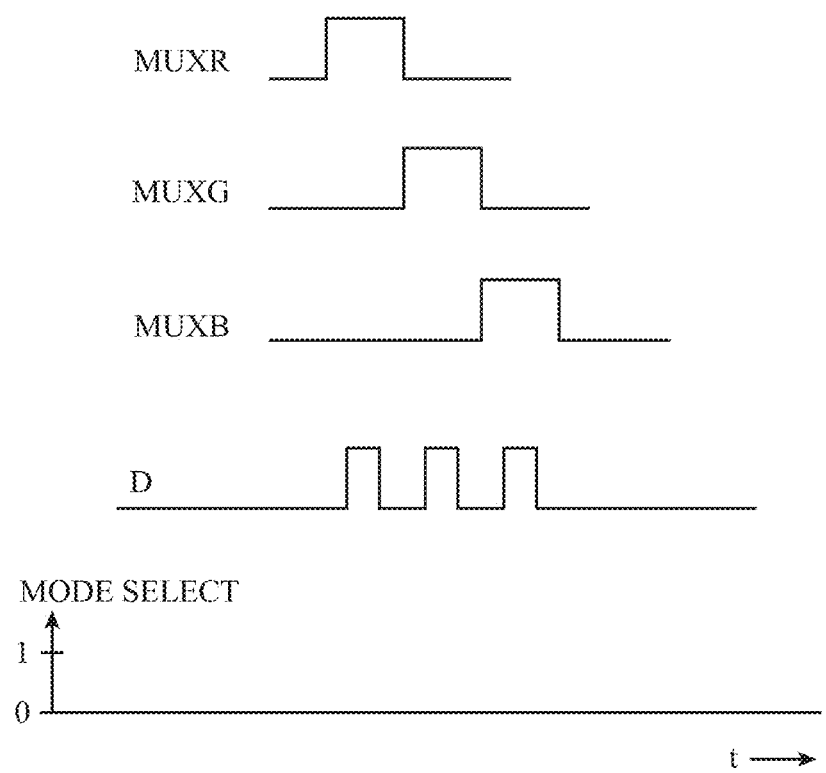
FIG. 7 is a timing diagram showing how image data may be loaded into a display in accordance with an embodiment.

FIG. 7 is a timing diagram showing how image data D may be loaded into the pixels of display 14. Pixels 22 may be loaded with image data using circuitry of the type shown in FIG. 5 and using circuitry of the type shown in FIG. 6 while signal MODE_SELECT is deasserted.

As shown in FIG. 7, demultiplexer control signals MUXR, MUXG, and MUXB for demultiplexer 134 may be asserted in sequence while the circuitry of each gamma block 108 and each gamma multiplexer 110 is being used to produce desired values of data signal D on each data line 114. As MUXR is asserted, the current value of D is routed to a column of red subpixels. Assertion of MUXG and MUXB likewise are used to route the current value of D for each data line to columns of green and blue pixels, respectively. MODE_SELECT may be deasserted during the loading of normal image data to ensure that the data signals that are supplied to input 130 of multiplexer 124 of FIG. 6 are routed to data line 132.

Figure 8:
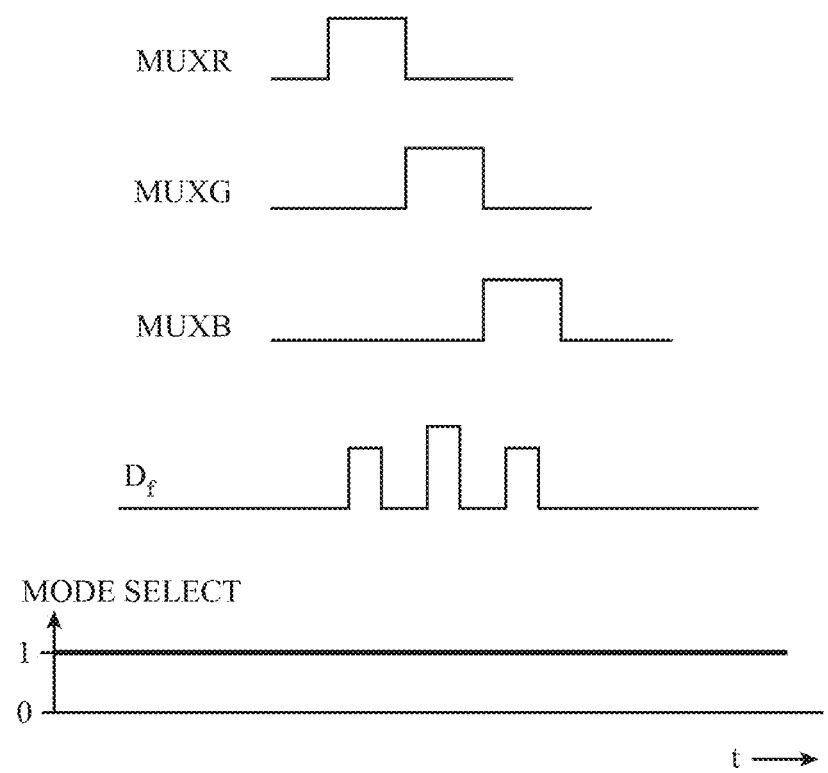
FIG. 8 is a timing diagram showing how flash data may be loaded into a display so that a region of the display produces flash illumination in accordance with an embodiment.

FIG. 8 is a timing diagram showing how flash data Df may be loaded into the pixels of region 100. During flash data loading operations, MODE_SELECT may be asserted to ensure that the flash data signals that are supplied to input 128 of multiplexer 124 of FIG. 6 from converter 122 are routed to data line 132. As shown in FIG. 8, demultiplexer control signals MUXR, MUXG, and MUXB for demultiplexer 134 may be asserted in sequence while gamma converter 122 is being used to produce desired values of data signal Df on each data line 114 for each of the different colors of subpixels in region 100. As MUXR is asserted, the current value of Df is routed to a column of red subpixels. Assertion of MUXG and MUXB may likewise be used to respectively route the current value of Df to columns of green and blue pixels in region 100. Aside from changing the value of Df for each subpixel color, the value of Df is generally not changed so that all of region 100 is illuminated uniformly. Configurations in which region 100 is not illuminated uniformly may be handled by directing converter 122 to vary the value of Df for different portions of region 100.

Figure 9:
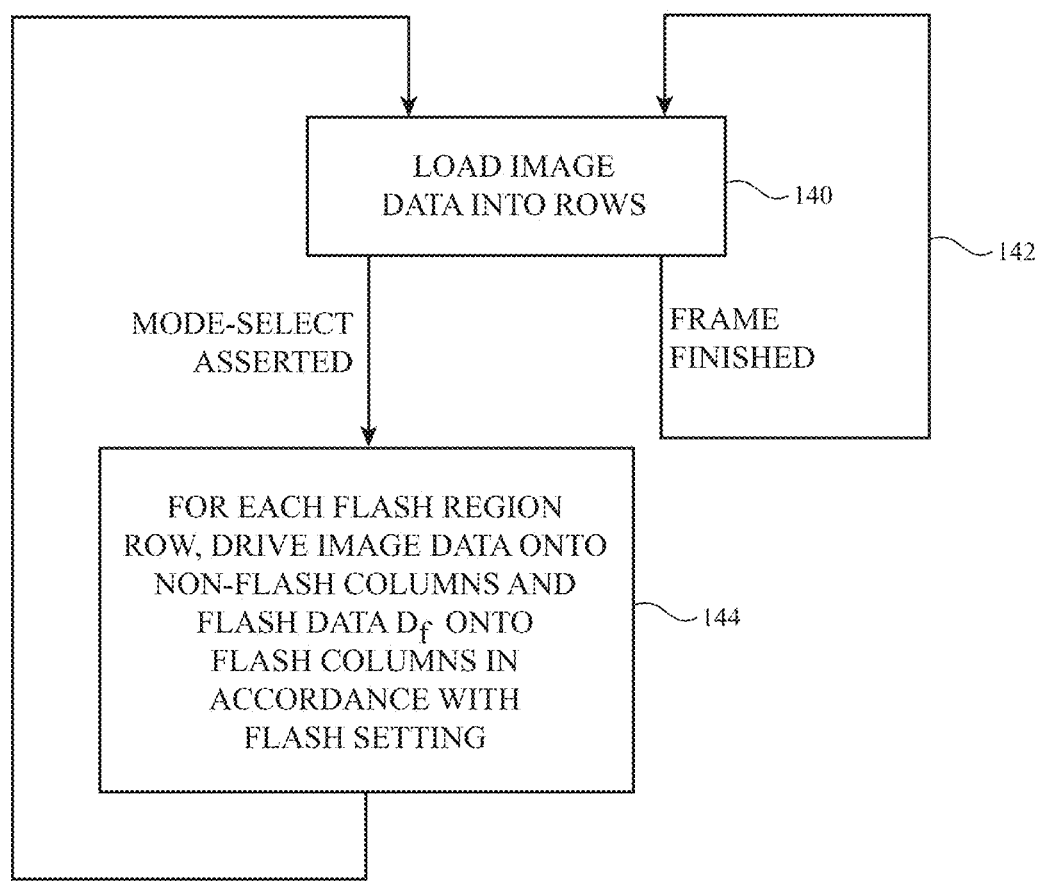
FIG. 9 is a flow chart of illustrative operations involved in loading flash data into a display so that a region of the display produces flash illumination in accordance with an embodiment.

FIG. 9 is a flow chart of illustrative steps involved in loading image data and flash data into pixels 22 of display 14.

During the operations of step 140, the display driver circuitry of FIG. 5 and FIG. 6 may load image data into each of the rows of display 14 that do not overlap flash region 100. As an example, gate lines G0 . . . GK−1 may be asserted in sequence while image data is presented to all data lines D0 . . . DF.

In situations in which no flash data is to be presented (e.g., in situations in which flash region 100 is being used to display an image and is not being used to produce flash illuminations), the operations of step 140 may be used to load data into all rows of display 14 (e.g., rows GK . . . GF) while image data is presented to all data lines D0 . . . DF. Once an entire frame of image data has been loaded into display 14 and displayed for a user, processing may loop back to step 140, as indicated by line 142, so that another frame of image data may be processed.

In situations in which flash data is to be presented in flash region 100, signal MODE_SELECT may be asserted (step 144). During step 144, the gate lines of display 14 that overlap flash region 100 may be asserted in sequence. At the same time, image data may be presented to the data lines that do not overlap the flash region while flash data is simultaneously presented to the data lines that do overlap the flash region. The remainder of the pixels in display 14 (i.e., the pixels in rows below the flash region, if any) may then be loaded with image data by deasserting MODE_SELECT and processing initiated for a fresh frame (step 140).

If desired, the display driver circuitry for display 14 may be configured to allow the position of flash region 100 to be adjusted by control circuitry 16. This approach may be used, for example, to allow a fingerprint(s) to be captured at a number of different locations on display 14.

Figure 10:
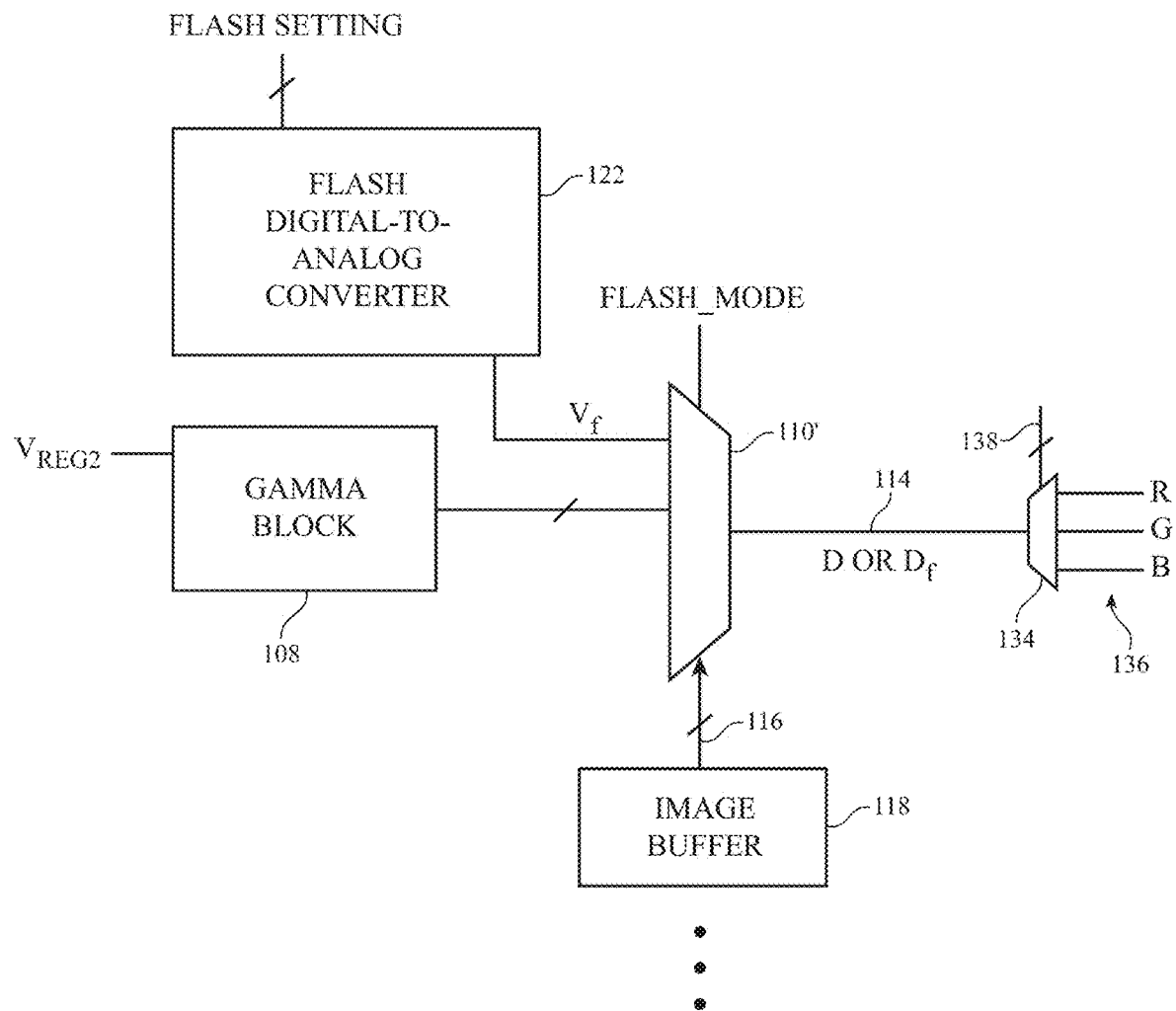
FIG. 10 is a diagram of illustrative display driver circuitry that may be configured to place a flash region in a desired location on a display in accordance with an embodiment.

Consider, as an example, the illustrative display driver circuitry of FIG. 10. In the example of FIG. 10, the gamma multiplexers of display 14 are provided with a first input that receives the output of gamma block 108 and a second input that receives flash data Vf from the output of converter 122. A flash control signal (e.g., FLASH_MODE) may be supplied to each gamma block 108. When FLASH_MODE is deasserted for the gamma multiplexer 110' for a given data line 114, that data line is provided with image data signals D from the gamma block 108 at the first input of that gamma multiplexer 110'. This allows normal data to be loaded onto subpixel data lines 136. When FLASH_MODE is asserted for the gamma multiplexer 110' for a given data line 114, that data line is provided with flash data signals Df from the flash digital-to-analog converter 122 at the second input of that gamma multiplexer 110'.

The flash mode selection input for the gamma multiplexer circuitry may be used to adjust the position of the flash region. The inputs for each of gamma multiplexers 100' may all be independent or groups of two or more of these inputs may be connected together to conserve circuit resources. In situations in which the FLASH_MODE signal in each column is independently adjustable by control circuitry 16, control circuitry 16 can select a pattern of asserted and deasserted FLASH_MODE signals to adjust the horizontal position of flash region 100 to any desired location within display 14. In situations in which there are fewer independently adjustable FLASH_MODE signals, the available horizontal positions for region 100 will be correspondingly restricted, but fewer different control lines will be required. Vertical positioning of region 100 may be implemented by asserting FLASH_MODE in appropriate columns while a set of gate lines that overlap the desired position of region 100 are being asserted.

During manufacturing, display 14 may be calibrated. For example, test image data may be displayed on display 14 while image calibration measurements are made and test flash data may be displayed in a test flash region of display 14 while flash calibration measurements are made. Resulting calibration data for display 14 (e.g., global image calibration data, region-specific image calibration data, pixel-by-pixel image calibration data, and flash region calibration data for all pixels, blocks of pixels, or each pixel in flash region 100) can then be stored in display 14 and used in producing calibrated image data with gamma block 108 and in producing calibrated flash illumination.

Control circuitry 16 may monitor sensors and other input-output devices 12 to determine when to initiate flash mode operations. For example, circuitry 16 may monitor input from a capacitive touch sensor to determine when a user's finger has been placed over flash region 100. The flash region can then be illuminated so that an array of light detectors 84 in this region can be used to capture a fingerprint (as an example). If desired, other types of sensor input can be processed by control circuitry 16 to determine when a user's finger or other object is in flash region 100 for fingerprint capture. For example, components 84 or other components in device 10 may include infrared emitters and sensors that form light-based proximity sensors. When a proximity sensor reading indicates that a user's finger is present, control circuitry 16 can illuminate region 100 and gather sensor readings from an array of light sensor components 84. In some situations, components 84 (e.g., light sensors) may output signals with a given level during normal ambient lighting conditions and may exhibit output signals with a temporarily reduced level when normal ambient lighting conditions are still present but a finger or other object is shadowing components 84. Force sensors (capacitive sensors, strain gauges, etc.) may be use to detect the presence of a users finger. In general, proximity sensor measurements, capacitive touch sensor measurements, ambient light sensor shadow detection, actuation of a force sensor (e.g., a strain gauge, etc.), actuation of a switch under region 100, or other suitable arrangements may be used in determining when to activate flash region 100 and capture a fingerprint. The foregoing examples are merely illustrative.

In operations such as fingerprint capture operations, it may be desirable for the illumination provided by the pixels of flash region 100 to be uniform. Accordingly, each of the pixels in this region may be provided with the same flash data Df. The color of the light produced in region 100 can be adjusted by adjusting the relative magnitude of the output produced by the red, green, and blue subpixels (or subpixels of other suitable colors) within this uniform data for region 100. If desired, different portions of region 100 can be provided with correspondingly different values of data Df (e.g., to produce patterned flash illumination, graded flash illumination, or flash region output with other non-uniform characteristics). Moreover, the non-flash region of display 14 may be used to display output with a particular brightness (normal, higher than normal, or lower than normal), a particular color (blue, green, red, or other colors), may be used to display a pattern of non-image data, may be used to display modified image data, or may be used to display other desired output during the use of flash region 100 to produce flash output. The use of the non-flash regions of display 14 to display normal image data while flash region 100 supplies uniform flash output is merely illustrative.

If desired, display 14 may be provided with a first region (e.g., region 100 of FIG. 4 or any other suitable portion of display 14) that has a brightness that is independently adjustable from the brightness of a second region of display 14 (e.g., the rest of display 14 of FIG. 4 outside of region 100). The brightness (maximum pixel luminance) in the first and second regions may be independently adjusted by using separate brightness control signals for the first and second regions. Using this type of arrangement, a local area of display 14 (e.g., region 100) may be provided with a boosted brightness for illumination purposes (e.g., to serve as a flash illumination for an array of light sensors, etc.) or may be provided with a locally dimmed or brightened appearance to enhance a user's interaction with content in the locally dimmed or brightened local area.

Figure 11:
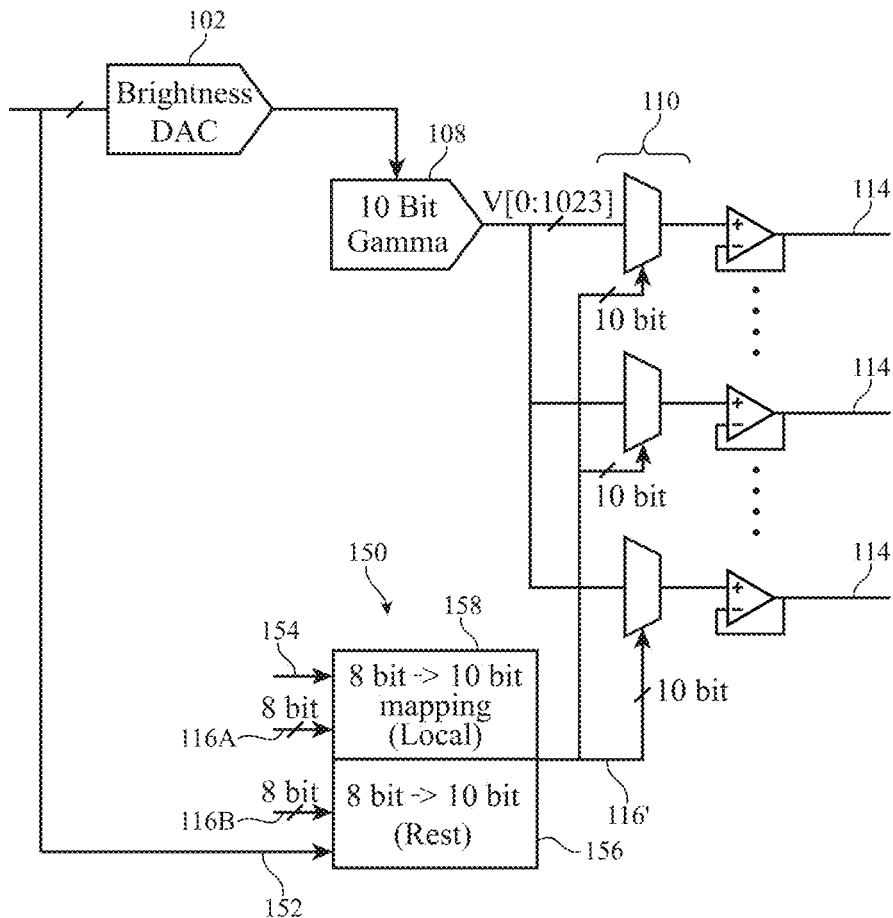
FIG. 11 is a diagram of illustrative display driver circuitry of the type that may be used to adjust display brightness in a local region of a display independently from the rest of the display in accordance with an embodiment.

FIG. 11 is a diagram of illustrative display driver circuitry of the type that may be used to adjust display brightness in a local region of a display independently from the rest of the display. The display driver circuitry of FIG. 11 may handle an expanded gamma. For example, instead of converting digital image data into 256 gray voltage levels, the display driver circuitry of FIG. 11 may convert digital image data and brightness control data into 1024 voltage levels.

As shown in FIG. 11, image data mapping circuitry 150 may receive 8-bit image data and may produce corresponding 10-bit gamma block digital input data for gamma multiplexer circuitry 110 on path 116'. Circuitry 150 therefore maps 8-bit input image data to 10-bits of output data on path 116' at the digital input to gamma multiplexer circuitry 110 to cover up to 1024 voltages levels. The maximum luminance associated with these 1024 values may exceed the maximum luminance available in a comparable 256 level system (as an example), so that display 14 can exhibit locally enhanced brightness. The ability of display 14 to exhibit enhanced display brightness can be provided to all of the pixels in display 14 (i.e., all of display 14 may have pixels 22 that are provided with up to 1024 voltage levels) or only portions of display 14 may have the ability of display 14 to exhibit enhanced display brightness (i.e., only pixels 22 in region 100 may receive up to 1024 voltage levels over corresponding data lines 114).

Mapping circuitry 150 may include 8-bit to 10-bit mapping circuits 156 and 158. Circuit 158 may receive local brightness control signals on brightness control input 154 for a region such as region 100 and circuit 156 may receive brightness control signals on brightness control input 152 for the rest of display 14. Image data for local region 100 of display 14 may be provided to mapping circuit 158 from image buffer 118 at input 116A. Image data for the rest of display 14 may be provided to mapping circuit 156 from image buffer 118 at input 116B. The image data at inputs 116A and 116B may be 8-bit data or may have any other suitable bit size. The corresponding output data on path 116' may be 10-bit data or may have any other suitable size larger than the input data.

Mapping circuitry 150 may produce an output that is based on the image data and brightness control data presented to the inputs of mapping circuitry 150. Mapping circuit 158 may, for example, produce an output that is equal to the product of the grey level (image data) presented at input 116A and the brightness control signal for region 100 that is presented at input 154, whereas mapping circuit 156 may produce an output that is equal to the product of the grey level (image data) presented at input 116B and the brightness control signal for the region of display 14 other than region 100 that is presented at input 152.

Figure 12:
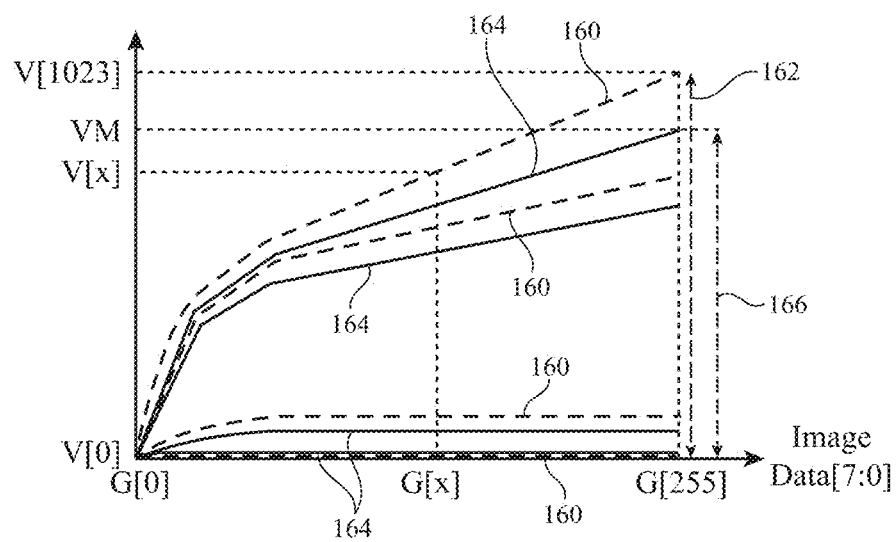
FIG. 12 is a graph in analog pixel voltage has been plotted as a function of digital data value for a local display region and other portions of a display with driver circuitry of the type shown in FIG. 11 in accordance with an embodiment.

There may be two separate sets of gamma mappings for region 100 and the rest of display 14 (i.e., two corresponding sets of curves relating input digital data values to the analog voltage levels produced by circuitry 110 for pixels 22). Consider, as an example, the gamma curves of FIG. 12, which include a first set of curves (curves 160) and a second set of curves (curves 164). Each of the curves in each set of curves corresponds to a different brightness setting. In the example of FIG. 12, the maximum pixel luminance in region 100 corresponds to analog pixel voltage V[1023] and is larger than the maximum pixel luminance in the rest of display 14, which corresponds to analog pixel voltage VM. This is merely illustrative. The maximum pixel luminance for region 100 and the rest of display 14 may be the same or region 100 may have a maximum pixel luminance that is lower than the rest of display 14.

In the illustrative configuration of FIG. 12, curves 160, which correspond to region 100, show how the pixels in region 100 may have a maximum luminance that lies within range 162 (i.e. a value from V[0] to V[1023]), depending on the current brightness setting at input 154. Curves 164, which correspond to the rest of display 14, show how the pixels in the rest of display 14 may have a maximum luminance that lies within range 166 (i.e., a value from V[0] to VM), depending on the current brightness setting at input 152.

The brightness of the content in region 100 can be adjusted using brightness setting 154 independently of the brightness of the content in the rest of display 14, which is adjusted using brightness setting 152. Region 100 can have a momentarily enhanced brightness (e.g., to produce a flash of illumination in configurations in which region 100 contains an array of light sensors 84) or can be provided with enhanced brightness for longer periods of time. While the brightness setting for region 100 is being momentarily enhanced, the digital image data corresponding to region 100 can be provided with a single value (e.g., to produce a block of solid white illumination) or may correspond to a pattern or part of an image. If desired, the independence of the brightness adjustments for region 100 and the rest of display 14 may be used to reduce the brightness of the pixels in region 100 relative to the pixels in the rest of display 14. The use of separate brightness adjustments for region 100 and the rest of display 14 to produce a momentarily enlarged brightness in region 100 is merely illustrative.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
    an array of display pixels;
    a sensor at least partially overlapping the array of display pixels; and
    control circuitry configured to adjust a subset of display pixels in the array in response to the sensor detecting a shadow of an external object.

2. The electronic device of claim 1, wherein the array of display pixels emits light in a first direction and wherein the sensor at least partially overlaps the array of display pixels in a second direction opposite the first direction.

3. The electronic device of claim 1, wherein the control circuitry is further configured to adjust the subset of display pixels to output only white light in response to the detecting the shadow.

4. The electronic device of claim 1, wherein the array of display pixels is configured to display an image and wherein the control circuitry is further configured to adjust the subset of display pixels to output a modified portion of the image in response to the detecting the shadow.

5. The electronic device of claim 1, wherein the control circuitry is further configured to adjust the subset of display pixels to momentarily increase or decrease brightness in response to the detecting the shadow.

6. The electronic device of claim 1, wherein the control circuitry is further configured to adjust a color or a color temperature of the subset of display pixels in response to the detecting the shadow.

7. The electronic device of claim 1, wherein the control circuitry is further configured to adjust the subset of display pixels to output uniform flash data for a single frame in response to the detecting the shadow.

8. An electronic device comprising:
an array of display pixels;
a proximity sensor at least partially overlapping the array of display pixels; and
control circuitry configured to adjust a subset of display pixels in the array in response to the proximity sensor detecting an external object.

9. The electronic device of claim 8, wherein the array of display pixels is interposed between the proximity sensor and the external object.

10. The electronic device of claim 8, wherein the control circuitry is further configured to adjust the subset of display pixels to output only white light in response to the detecting the external object.

11. The electronic device of claim 8, wherein the array of display pixels is configured to display an image and wherein the control circuitry is further configured to adjust the subset of display pixels to output a modified portion of the image in response to the detecting the external object.

12. The electronic device of claim 8, wherein the control circuitry is further configured to adjust the subset of display pixels to momentarily increase or decrease brightness in response to the detecting the external object.

13. The electronic device of claim 8, wherein the control circuitry is further configured to adjust a color or a color temperature of the subset of display pixels in response to the detecting the external object.

14. The electronic device of claim 8, wherein the control circuitry is further configured to adjust the subset of display pixels to output uniform flash data for a single frame in response to the detecting the external object.

15. An electronic device comprising:
an array of display pixels;
a switch at least partially overlapping the array of display pixels;
a sensor at least partially overlapping the array of display pixels; and
control circuitry configured to adjust a subset of display pixels in the array in response to actuation of the switch.

16. The electronic device of claim 15, wherein the array of display pixels emits light in a first direction and wherein the switch at least partially overlaps the array of display pixels in a second direction opposite the first direction.

17. The electronic device of claim 16, wherein the sensor at least partially overlaps the array of display pixels in the second direction.

18. The electronic device of claim 15, wherein the subset of display pixels overlaps the sensor.

19. The electronic device of claim 18, wherein the sensor comprises a light sensor.

20. The electronic device of claim 19, wherein the sensor is configured to detect an external object.

* * * * *